Jan. 10, 1956   D. P. GUIDRY   2,730,130
MULTIPLE VALVE
Filed Jan. 14, 1955   3 Sheets-Sheet 1
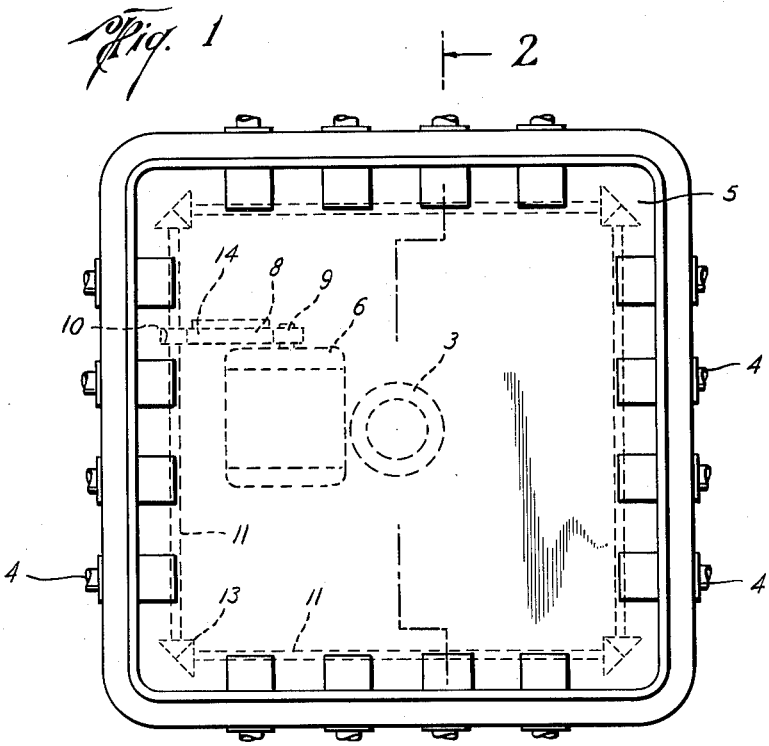
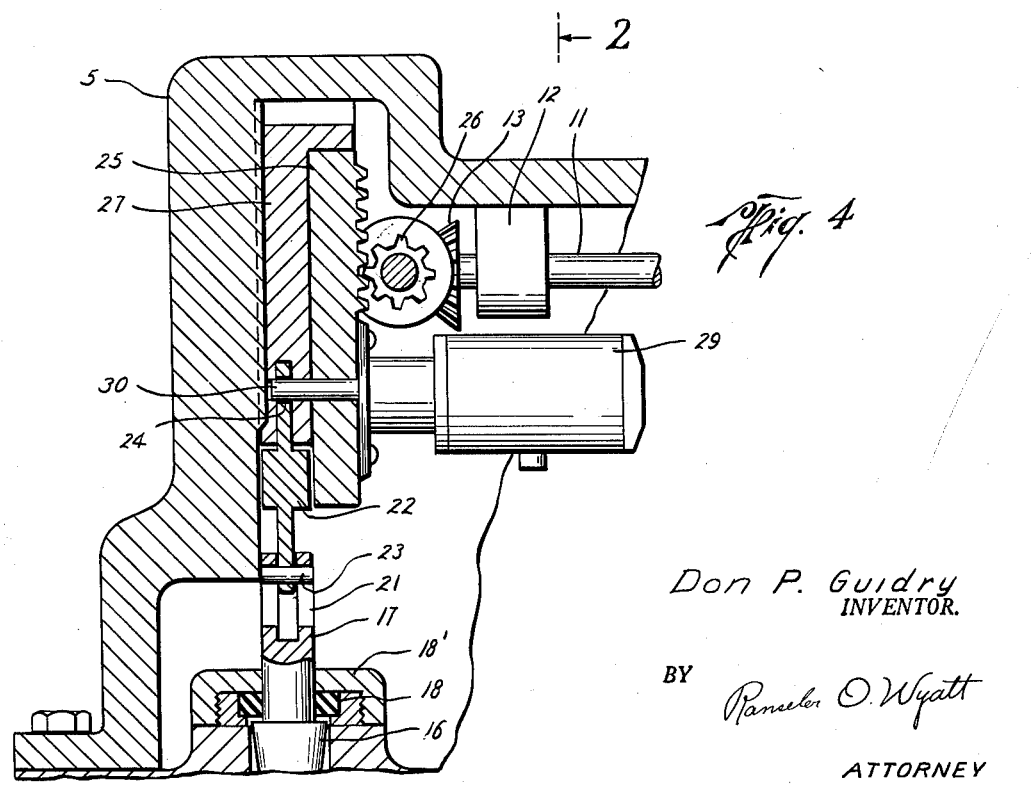
Don P. Guidry
INVENTOR.
BY Ranseler O. Wyatt
ATTORNEY

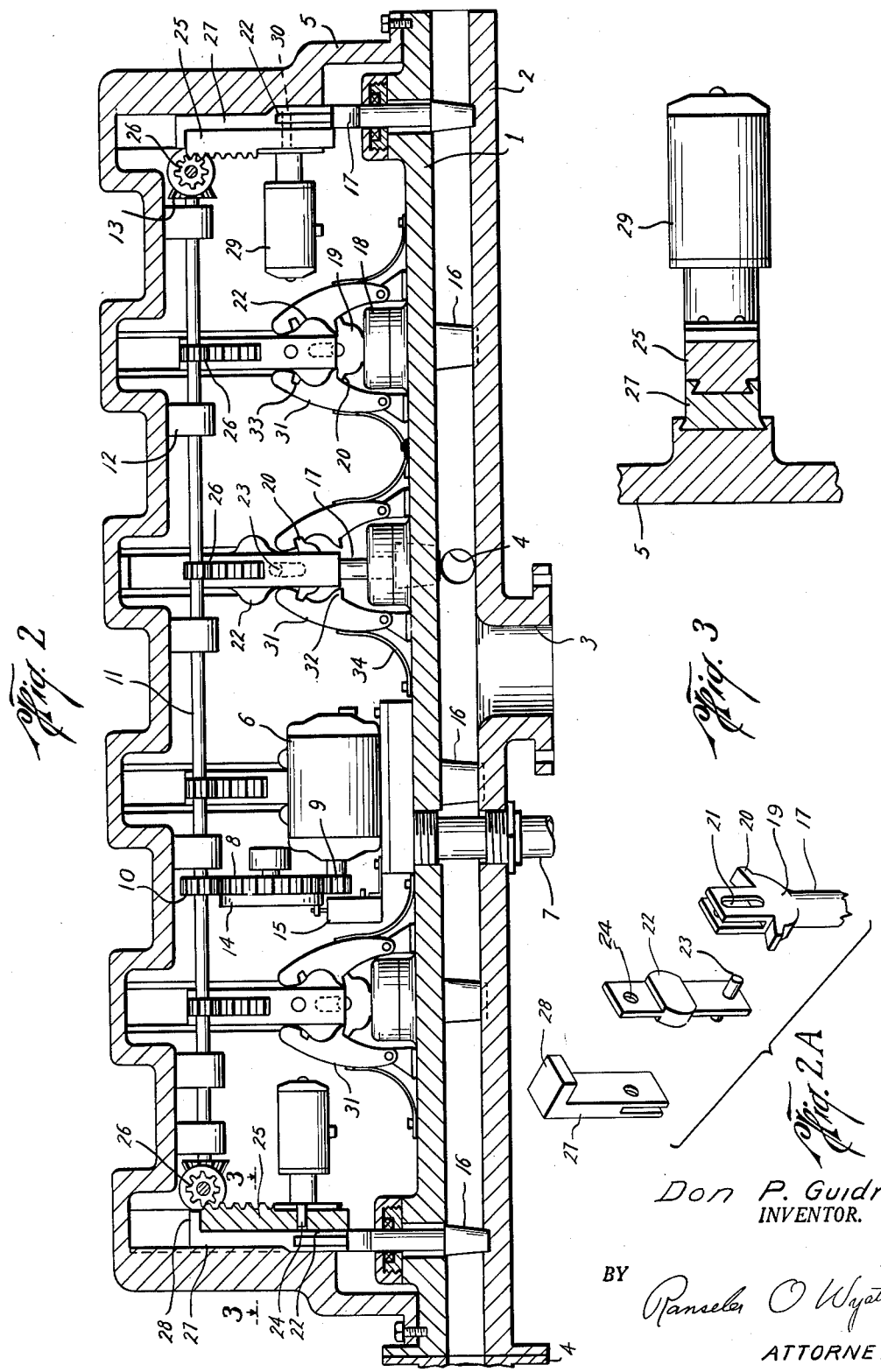

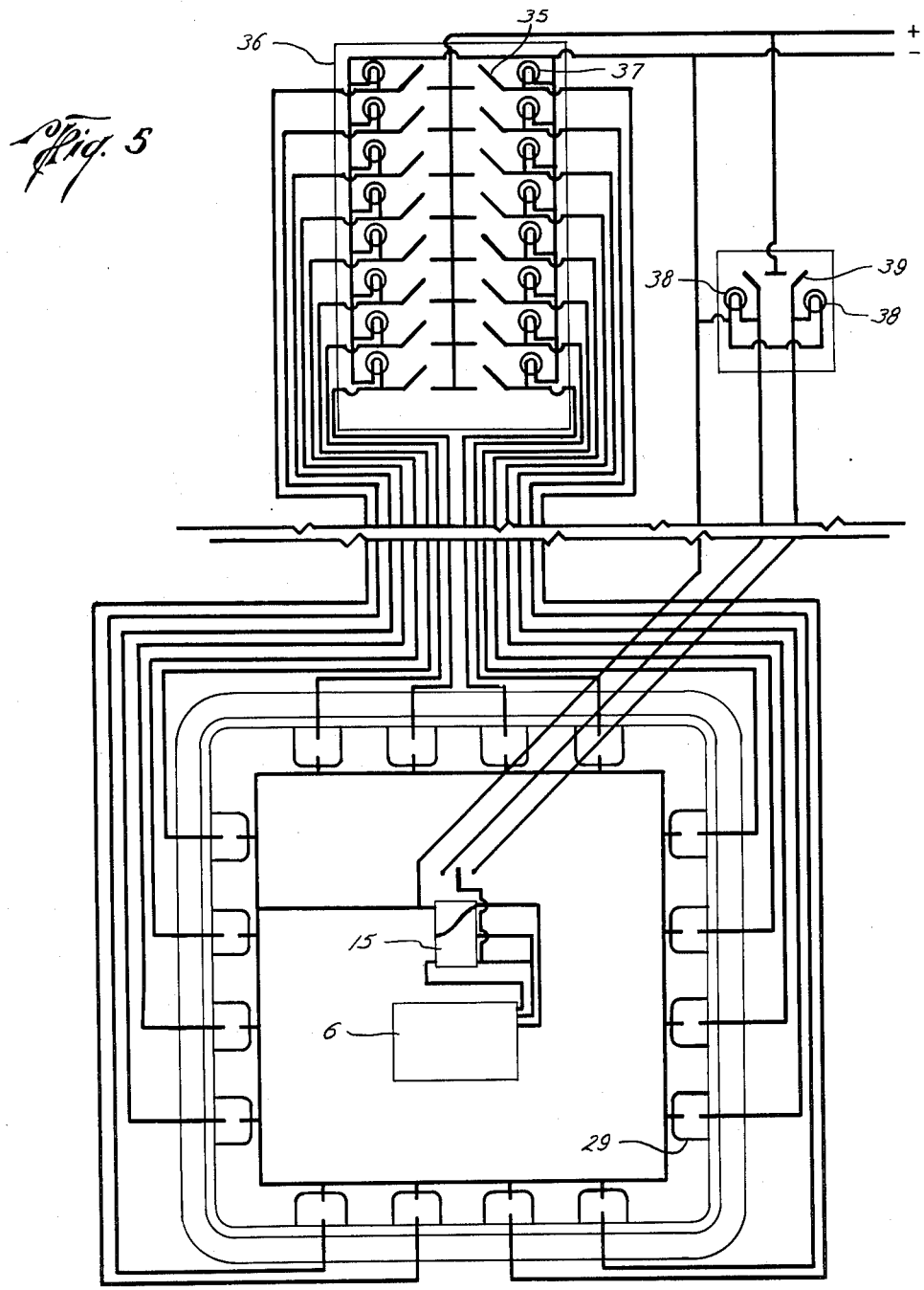

2,730,130

MULTIPLE VALVE

Don Paul Guidry, Houston, Tex.

Application January 14, 1955, Serial No. 481,902

9 Claims. (Cl. 137—635)

This invention relates to new and useful improvements in a multiple valve.

It is an object of the invention to provide a multiple valve that will enable an operator to selectively open or close one or more of a series of valves, by electrically powered means.

It is another object of the invention to provide a multiple valve having a common manifold and a series of selectively operable valves having novel means for raising and lowering said valves into and out of open position.

It is still another object of the invention to provide a multiple valve having novel means for locking each of said valves against premature movement into or out of open position.

With the above and other objects in view, the invention has relation to certain novel features of construction, operation and arrangement of parts more particularly defined in the following specifications and illustrated in the accompanying drawings, wherein:

Figure 1 is a top view of the valve assembly, showing the motor and connection with the gear system in dotted lines.

Figure 2 is a side elevational view, in section, taken on the line 2—2 of Figure 1.

Figure 2A is an exploded isometric view of the components of the valve stem and lifting means.

Figure 3 is a top view, in section, taken on the line 3—3 of Figure 2, and

Figure 4 is an enlarged elevational view, in cross section, of the valve lifting mechanism employed.

Referring now more particularly to the drawings, the numerals 1, 2 designate the upper and lower walls of a manifold of any desired shape, but preferably square, as shown in Figure 1. A conduit 3 leads into the manifold at any suitable location and any number of valve controlled conduits as 4, 4 are provided in the manifold. Mounted on the upper surface of the manifold 1 is the lifting assembly housing 5, which may be of sufficient strength to render same explosion proof. Within the housing 5 is a suitable electric motor 6 which is supplied from a suitable source (not shown) through the conduit 7 and which is in geared connection with the gear 8 through the driving gear 9. The gear 8 drives the gear 10 which rotates the drive shafts 11, 11, which are suspended in suitable bearings as 12 mounted in the housing 5. Suitable pinion gears as 13, 13, transmit rotation to the drive shaft 11 around the entire manifold. A timing gear 14 is mounted on the gear 8 and rotates therewith, and is in geared connection with the timing switch 15.

A series of valves, as the gate valves 16, are mounted in the housing 5 having the valve stems 17 which extend into the manifold housing 5. These gates 16 control the flow of fluid through the conduits 4, 4. The valve stems 17, which extend into the housing 5 from the valve gates 16, are sealed off by suitable glands or packing as 18, 18. The upper ends of the valve stems as 17 terminate in a yoke 19. The yoke 19 has outwardly directed ears 20, 20 and a vertical slot as 21, 21 in each side thereof. The free link 22 has its side margins outwardly flared and has the solenoid pin receiving hole 24 adjacent its upper end.

The valve stems and valves are raised and lowered into position by means of the geared racks 25 which are in mesh with the gears 26 on the shafts 11. Each rack 25 is dovetailed to a lifting bar as 27 and the upper end of the lifting bar 27 is provided with the lateral extension 28 which rests on the top of the rack 25. An electrically operable spring loaded solenoid, as 29 is mounted on the rack 25 and has a retractible plunger 30. The rack 25 and the bar 27 have transverse ports adapted to be aligned to receive the plunger 30. When it is desired to lift a valve as 16, the solenoid is activated and the plunger extended through the port in the rack 25, the bar 27 and the port 24 in the link 22, and the motor 6 activated to rotate the drive shafts 11 and the gears 26.

Embracing the valve stem 17 of each valve and pivotally mounted on the plate 1, are the locking arms 31, 31. These arms are spring loaded to constantly urge them inwardly against the valve stem, and having the inwardly projecting dogs 32 and the projection receiving notches 33. Any type of spring may be employed such as the springs 34 shown in the drawing.

Each rack 25 has a solenoid 29 and it is contemplated that a control panel at a place, possibly remote from the location of the manifold, will be employed to control the valves. The electrical diagram shown in Figure 5 will provide for up and down movement of the racks by means of a dual circuit through the motor 6 which will move the racks upwardly upon closing one of the circuits and upon the racks reaching uppermost position, the timing gear will operate the switch 15 to reverse the circuit to the motor 6 which will necessitate closing the down switch to again activate the motor, in reverse, and to lower the racks.

When the operator selects the valves he wishes opened, the solenoids on the racks of the valves selected will be activated, by closing the switch, as 35, on the panel board 36, thus moving the plungers 30 through the port in the bar 27 and through the port in the link 22. The panel light, as 37, will indicate which switches have been closed to activate the solenoids and signal lights, as 38, 38, may be provided to inform the operator as to whether the racks have been moved up or down. The motor 6 is then activated as by closing the switch 39 and the rack 25 moves upwardly carrying the bar 27 and the link 22 with it. As the link 22 moves upwardly, the flared sides of the link 22 move the arms 31 out of engagement with the projections 20, so that when the pin 23 contacts the end of the slot 21 in the yoke 19, the valve stem will be lifted upwardly. When the uppermost position has been reached, the locking arms 31 will engage the projections 20 by receiving same in the slots 33, thus holding the valve open. All of the valves that have not been opened will remain closed, the locking arms 31 maintaining them closed by means of the inwardly directed projections 32. The arms 31 will also maintain the link 22 in alignment to be again received by the bar 27 when it is again lowered. When the valve stem is raised to move the gate to open position, and it is desired to leave it there, the solenoid connecting said valve may be deactivated and the plunger 30 retracted. The locking arms 31 will maintain the valve in open position and the rack 25 may be lowered. When the rack 25 is lowered, the bar 27 will drop the length of the slot 21, but when it is desired to lower the valve, the rack 25 is again raised, and the top of the rack 25 will bear against and lift the bar 27 into full raised position and align the ports therein with the port in the link 22. Thereupon the solenoid may be reactivated, extending the plunger 30 through the ports in the bar 27 and link 22 and the motor 6 reversed and the rack lowered. The sides of the link 22 will, by cam action, move the locking arms outwardly, disengaging the projections 20 from the slots 33 and as the pin 23 contacts the lower end of the slots 21 the valve stem 17 is lowered and as it reaches lowermost position, the locking arms 31 will close, the projections 32 will be moved over the projections 20 and the valve thus locked in closed position. The operator may desire to activate any selected valve, and upon engaging the solenoid plunger by closing the circuit to same through the switch on the control panel provided for that purpose, the motor 6 may be activated and all of the racks 25 will be lifted, and the bars 27 will, of course, rise with the racks 25. The links 22 will be locked in place and maintained in place by the arms 31, 31, and the dovetailed connection of the rack 25 with the bar 27 and the bar 27 with the housing 5 will maintain the moving parts in constant alignment. The movement of the racks will be either all of the way up or all of the way down. The timing gear 14 will cause the timing switch 15 to break the circuit upon completion of the movement of the racks all of the way up or all of the way down. It will necessitate another manual operation of the switch to close the circuit through the timing switch 15 to complete a cycle of movement. The timing switch 15 not only breaks the circuit upon completion of an up or down movement but in addition thereto reverses the poles so that the direction of rotation of the motor 6 is reversed, thus the possibility of an accidental opening or closing of any of the valves in the manifold by inadvertent completion of a cycle will be avoided.

While the foregoing is considered a preferred form of the invention, it is by way of illustration only, the broad principle of the invention will be defined by the appended claims.

What I claim is:

1. In a multiple valve, a manifold housing, an inlet opening into said housing and a plurality of outlet openings in said housing, a valve actuating mechanism housing on said manifold, valves controlling the outlet openings in said manifold, valve stems extending from said valves through said manifold housing into said actuating mechanism housing, a motor, means in connection with said motor for selectively raising and lowering said valve stems, and means for releasably maintaining said valve stems in open or closed position.

2. In a multiple valve, a manifold housing, an inlet opening in said housing, outlet openings in said housing, valves controlling said outlet openings, a valve actuating mechanism housing on said manifold housing, means in said valve actuating mechanism housing for opening and closing said valves, said means comprising a rotating mechanism, drive shafts driven by said rotating mechanism, racks in geared connection with said drive shaft adapted to be raised and lowered, valve stems extending from said valves into said valve actuating mechanism housing adjacent said racks, means for selectively connecting valve stems with racks to raise or lower said stems and to open or close said valves.

3. In a multiple valve, a manifold housing, an inlet opening in said housing, outlet openings in said housing, valves controlling said outlet openings, a valve actuating mechanism housing on said manifold housing, means in said valve actuating mechanism housing for opening and closing said valves, said means comprising: a motor, a series of drive shafts, geared connections between said motor and drive shafts, a series of vertically movable racks, lifting bars parallel with said racks and maintained in alignment therewith, valve stems extending from said valves into said valve actuating mechanism housing adjacent said racks, means for selectively engaging said valve stems with said lifting bars and opening or closing said valves, a timing gear in operative connection with said motor and a timing switch controlled by said gear for breaking the circuit upon completion of an up or down movement and reversing the direction of rotation of said motor.

4. In a multiple valve, a manifold housing, an inlet opening in said housing, outlet openings in said housing, valves controlling said outlet openings, a valve actuating mechanism housing on said manifold housing, means in said valve actuating mechanism housing for opening and closing said valves, said means comprising: a motor, a series of drive shafts, geared connections between said motor and drive shafts, a series of vertically movable racks, lifting bars parallel with said racks and maintained in alignment therewith, valve stems extending from said valves into said valve actuating mechanism adjacent said racks, means for selectively engaging said valve stems with said lifting bars and opening or closing said valves, a timing gear in operative connection with said motor and a timing switch controlled by said gear for breaking the circuit upon completion of an up or down movement and reversing the direction of rotation of said motor and means for releasably maintaining said valves in open or closed position.

5. In a multiple valve, a manifold housing, an inlet opening in said housing, outlet openings in said housing, valves controlling said outlet openings, a valve actuating mechanism housing on said manifold housing, means in said valve actuating mechanism housing for opening and closing said valves, said means comprising: a plurality of vertically movable racks, drive shafts having gears in connection with said racks, a source of power for rotating said shafts, lifting bars adapted to be raised by said racks, valve stems extending from said valve into said valve actuating mechanism housing, a yoke on the upper end of said valve stems having vertical slots therein, a link mounted in said yoke having transverse studs extending into said slots and means for selectively connecting said rack, lifting bar and link.

6. In a manifold valve, a manifold housing, an inlet opening in said housing, outlet openings in said housing, valves controlling said outlet openings, a valve actuating mechanism housing on said manifold housing, means in said valve actuating mechanism housing for opening and closing said valves, said means comprising: a plurality of vertically movable racks, drive shafts having gears in connection with said racks, a source of power for rotating said shafts, lifting bars adapted to be raised by said racks, valve stems extending from said valve into said valve actuating mechanism housing, a yoke on the upper end of said valve stems having vertical slots therein, a solenoid carried by said racks having a movable plunger, transverse parts in said racks, said lifting bars and said links adapted to receive said plunger, means for selectively activating said solenoids to move said plungers into connecting relation with the valve stems to move said valves into open and closed position.

7. The device as described in claim 6 having pivotally mounted spring loaded locking arms adapted to selectively maintain said valve stems in open or closed position.

8. In a multiple valve, a valve manifold, an inlet opening in said manifold and a plurality of outlet openings in said manifold, a valve controlling each of said outlet openings, a valve actuating mechanism housing on said manifold, valve stems extending from each of said valves into said housing, means for releasably locking said valve stems in raised or lowered position comprising a connecting link between said raising mechanism and said valve stem, transverse studs extending from one end of said link, a yoke on said valve stem having vertical slots adapted to receive said studs, outwardly flared side margins on said link, a pair of pivotally mounted locking arms bearing against said yoke and adapted to lock said yoke in open or closed position.

9. In a multiple valve assembly, a series of valves and valve stems, a series of valve actuating mechanisms having vertically movable racks, lifting bars in operative connection with said racks, connecting links between each of said lifting bars and said valve stems, a yoke on each of said valve stems having vertical slots, lateral studs on the lower end of each of said links, said studs being movable in said slots, spring loaded locking arms pivotally mounted adjacent and bearing against said yokes, means on said yoke for releasably engaging said locking arms when said valve stem, is in open or closed position, and means on said link for moving said locking arms out of engagement with said yoke.

References Cited in the file of this patent

UNITED STATES PATENTS

| | | |
|---|---|---|
| 157,554 | Stone | Dec. 8, 1874 |
| 344,088 | Donkin | June 22, 1886 |
| 2,328,029 | Porter | Aug. 31, 1943 |
| 2,420,588 | Dunnihoo | May 13, 1947 |
| 2,639,729 | Tulumello | May 26, 1953 |